ated Sept. 22, 1970

3,529,927
ASSISTANT FOR FIXING CATIONIC DYES ON FIBERS OF ACRYLONITRILE POLYMERS
Hans-Jochem Ulrich, Ludwigshafen (Rhine), Germany, assignor to Badische Anilin- & Soda-Fabrik Aktiengesellschaft, Ludwigshafen (Rhine), Germany
No Drawing. Filed Apr. 5, 1967, Ser. No. 628,535
Claims priority, application Germany, Apr. 9, 1966,
1,619,334
Int. Cl. D06p 5/04
U.S. Cl. 8—171                                             10 Claims

ABSTRACT OF THE DISCLOSURE

Process for the dyeing of polyacrylonitrile fibers and copolymers thereof with cationic dyes from an aqueous pad liquor or printing paste wherein, as a fixing assistant for cationic dyes, a composition containing ethylene carbonate, propylene carbonate and mixtures $\phi$ thereof, at least one nonionic surfactant in the weight ratio 15:85 to 85:15 and if desired up to 2% by weight of an antifoam agent, e.g., trialkyl phosphate is incorporated in said pad liquor or printing paste; and subsequently steaming the padded or printed fibers in the presence of said fixing assistant.

---

It is known that acrylonitrile polymer fibers may be dyed with cationic dyes by the exhaustion method. If however basic dyes are applied to fibrous material of acrylonitrile polymers by padding or printing and fixed by steaming, the yield of dye is so poor that only light colorations are obtained. To avoid this disadvantage it has already been proposed to carry out pad dyeings using liquors containing not only basic dyes and conventional additives but also ethylene carbonate and if desired small amounts of nonionic surfactants. Heavy shades are only obtainable according to the said prior art method if very high concentrations of the order of 100 g./l. of ethylene carbonate are used in the pad liquor; since ethylene carbonate is a solvent for acrylonitrile polymers, this may lead to considerable damage to the fibers. Moreover the dye is not uniformly fixed according to this prior art method, particularly in the case of deep combination dyeings, so that it is not possible to obtain heavy and level colorations.

It is an object of the present invention to fix cationic dyes or acrylonitrile polymers in particularly level shades and without the risk of damage to the fiber. Another object of the invention is to make those cationic dyes susceptible to fixation on acrylonitrile polymers by steaming which have been unsuitable in conventional methods. It is a further object of the invention to provide an improved assistant which permits the uniform fixing of any cationic dye on acrylonitrile polymer fibers in full shades and which does not damage the fibers during fixation. Finally, it is an object of this invention to use far less ethylene carbonate than hitherto in the steam fixation of cationic dyes on acrylonitrile polymer fibers.

These objects are achieved in accordance with this invention by an assistant for fixing cationic dyes on acrylonitrile polymer fibers with steam which comprises (a) ethylene carbonate and/or propylene carbonate; and (b) one or more non-ionic surfactants in the weight ratio of (a):(b) of 15:85 to 85:15, preferably 35:65 to 65:35. Although the effective combination (a)+(b) of the said agents consists only partly of ethylene carbonate and/or propylene carbonate, it can nevertheless be used in much smaller amounts than ethylene carbonate alone and moreover it may be used effectively within a much wider range.

In the simplest case, the assistant according to this invention consists solely of the components (a) and (b). Propylene carbonate is preferred as the component (a). Component (b) may be any nonionic surfactant or a mixture of two or more of such substances; among these, polyglycol derivatives are of particular industrial importance which contain a hydrophobic radical, particularly an alkyl group having six to twenty carbon atoms, an alkylaryl group having six to twenty carbon atoms in the alkyl radical or a polyether group having a carbon:oxygen molecular ratio of at least 3:1, and combined with this hydrophobic radical by way of oxygen, nitrogen or sulfur, at least one hydrophilic polyglycol radical having a carbon:oxygen molecular ratio of less than 3:1. Examples of polyether groups having a carbon:oxygen molecular ratio of at least 3:1 are polyether groups obtainable by adding on propylene oxide, butylene oxides, styrene oxide or mixtures of the same. Examples of hydrophilic polyglycol radicals having a carbon:oxygen molecular ratio of less than 3:1 are those obtainable from mixtures of ethylene oxide and propylene oxide and preferably from ethylene oxide alone. The chain length of the hydrophilic radical or radicals is preferably chosen so that the surfactant is soluble in water and has a pronounced wetting power. Among the nonionic surfactants those polyglycol derivatives of the said type are preferred which contain an alkyl group having six to twenty carbon atoms, for example a decyl group, dodecyl group, hexadecyl group or octadecyl group; or an alkylaryl group having six to twenty carbon atoms in the alkyl radical, for example an octylphenyl group, nonylphenyl group, decylphenyl group, dodecylphenyl group or octadecylphenyl group.

The adducts of seven to ten moles of ethylene oxide to one mole of octylphenol or nonylphenol and of eight to thirty moles of ethylene oxide to one mole of an aliphatic monoalcohol having twelve to eighteen carbon atoms or a mixture of such alcohols are examples of preferred substances of group (b).

The assistants according to this invention may contain components other than (a) and (b), for example solvents or diluents. It has proved to be convenient to add antifoams, for example trialkyl phosphates or other nonionic antifoams in an amount of up to 2% by weight based on the total weight.

Assistants according to this invention offer special advantages in all processes for dyeing and printing acrylonitrile polymer fibers with cationic dyes in which the dye is fixed by means of steam. It is therefore not intended either for bath dyeing by the exhaustion method or for fixing dyes by dry heat.

On the other hand the assistants are recommended in the case of all pad-steam methods, in printing acrylonitrile polymer fiber articles of flat shape followed by steam fixation, and in vigoureux printing. The advantages of the new assistants are particularly evident in continuous procedures.

The assistants according to this invention are added to the pad liquor or print paste in an amount of 5 to 50 g. per liter of pad liquor or per kilogram of print paste calculated as pure mixture of effective substance (a)+(b). In other respects the pad liquor or print paste has the conventional composition. In dyeing tops and tow, for example, steaming periods of twenty to sixty minutes and temperatures of from 100° to 110° C. are chosen, and in the pad-steam method for piece goods one to ten minutes and 100° to 110° C.

The new assistants make it possible to produce dyeings and prints of any desired tinctorial strength up to deepest black on acrylonitrile polymer fibers and mixtures of the same with other fibers (natural or synthetic) by steam fixation with minimum damage to the fiber. The use of the new assistants for dyeing and printing fibers which consist solely of acrylonitrile polymers is of particular industrial interest.

The term "cationic dye" includes dyes which are referred to as "Basic Dyes" in Colour Index, 2nd edition 1956 with supplement 1963.

Acrylonitrile polymers are defined as fiber-forming polymers obtainable by homopolymerization of acrylonitrile or by copolymerization of a predominant proportion (preferably at least 80%) of acrylonitrile with other polymerizable monomers; examples of such monomers are vinyl acetate, vinyl chloride, vinylidene chloride, acrylic acid and methacrylic acid and their derivatives or homologs, styrene, methyl vinyl ketone, and vinylpyridines, such as 2-vinylpyridine, 4-vinylpyridine, 5-ethyl-2-vinylpyridine or 2-methyl-5- vinylpyridine.

The acrylonitrile polymer fibers may for example be in the form of tow, tops, woven fabric, knitted fabric or yarn for dyeing or printing using the assistants according to this invention. In every case the assistants according to this invention give results such as have not hitherto been obtainable.

The invention is illustrated by the following examples in which parts and percentages are units of weight. "C.I." denotes "Colour Index, 2nd edition 1956 and supplement 1963." The formulas of the cationic dyestuffs employed in the following examples are:

C.I. Basic Yellow 24:

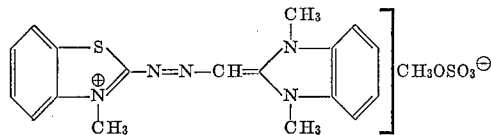

C.I. Basic Yellow 23:

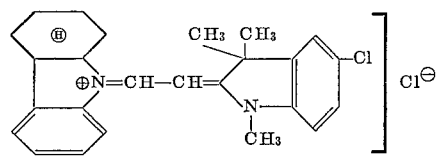

C.I. Basic Yellow 25:

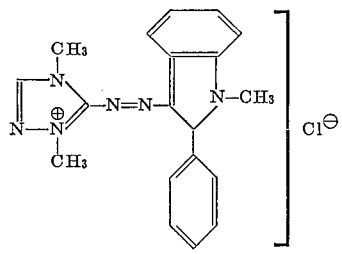

C.I. Basic Red 29:

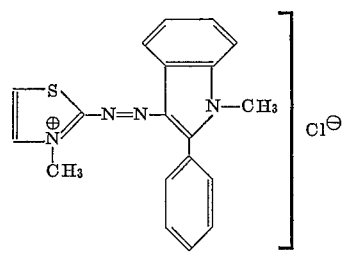

C.I. Basic Blue 54:

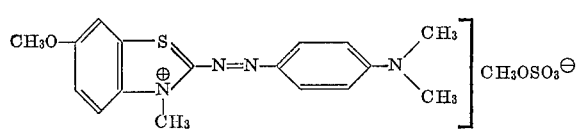

EXAMPLE 1

The assistant according to the invention consists of 49.5 parts of propylene carbonate, 49.5 parts of an adduct of 7 moles of ethylene oxide to 1 mole of nonyl phenol, and 1 part of triisobutyl phosphate.

Tops of polyacrylonitrile fibers are dyed as follows with the said assistant:

The tops are padded at room temperature with a liquor containing in water—

|  | G./l. |
|---|---|
| C.I. Basic Yellow 24 | 50 |
| C.I. Basic Red 29 | 20 |
| C.I. Basic Blue 54 | 30 |
| The assistant | 40 | which has been adjusted to pH 5 with acetic acid. The material is squeezed out to a wet pickup of 110%. The impregnated material is laid in perforated cans which are then steamed for thirty minutes in a pressure steamer at 106° C. The material may also be steamed in a continuous steamer of conventional design. The tops are washed in a conventional manner on a backwasher and it can be seen that the whole of the dye has been fixed because the washing liquor remains completely clear. The tops are dyed black.

An assistant consisting of 50 parts of ethylene carbonate and 50 parts of an adduct of 7 moles of ethylene oxide to 1 mole of isooctylphenol gives similar results when used in the same way.

EXAMPLE 2

An assistant according to the invention consists of 45 parts of propylene carbonate, 54 parts of an adduct of 7 moles of ethylene oxide to 1 mole of octylphenol and 1 part of triisobutyl phosphate.

A polyacrylonitrile tow is dyed as follows using this assistant:

The tow is padded as described in Example 1 with a liquor which contains, in water—

34 g./l. of C.I. Basic Yellow 24
20 g./l. of Basic Red 29
26 g./l. of the dye having the formula:

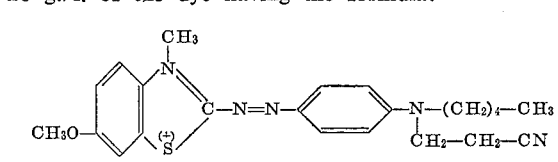

40 g./l. of the assistant and which has been adjusted to pH5 with hydrochloric acid. The impregnated material is steamed continuously for forty-five to thirty minutes at 100° to 103° C. and washed in the usual way. A full bloomy black having good fastness is obtained.

A mixture of 50 parts of propylene carbonate and 50 parts of an adduct of 10 moles of ethylene oxide to 1 mole of nonylphenol may be used with equally good results instead of the above-mentioned assistant.

EXAMPLE 3

An assistant according to the invention consists of 20 parts of propylene carbonate and 80 parts of an adduct of 9 moles of ethylene oxide to 1 mole of a mixture of fatty alcohols having twelve to eighteen carbon atoms.

It may be used as follows—

Polyacrylonitrile piece goods are padded at room temperature with a liquor which contains, in water:

|  | G./l. |
|---|---|
| C.I. Basic Yellow 23 | 23 |
| C.I. Basic Yellow 25 | 5.5 |
| C.I. Basic Blue 54 | 0.03 |
| The assistant | 20 |

The goods are then steamed either in a continuous steamer for three to twelve minutes at 106° to 100° C. or in a pad-roll unit for thirty minutes at 100° to 102° C. and washed and dried as usual. A yellow dyed material is obtained in which the dye is completely fixed.

EXAMPLE 4

An assistant according to the invention consists of 40 parts of ethylene carbonate, 58 parts of an adduct of 28 moles of ethylene oxide to 1 mole of a mixture of synthetic fatty alcohols having sixteen to eighteen carbon atoms and 1 part of triisobutyl phosphate.

Spools of polyacrylonitrile yarn are partly impregnated at room temperature by injection according to the space-dyeing method with a liquor which contains in water:

|  | G./l. |
|---|---|
| C.I. Basic Yellow 25 | 1 |
| Basic Red 29 | 35 |
| Basic Blue 54 | 6.6 |
| The assistant | 35 | and which has been adjusted to pH 5.5 with acetic acid. The spools are exposed for thirty minutes to a wet steam atmosphere at 100° C., rinsed and dried as usual. Yarn is obtained which is dyed red in places with good fastness.

EXAMPLE 5

An assistant according to the invention consists of 50 parts of propylene carbonate, 30 parts of an adduct of 7 moles of ethylene oxide to 1 mole of nonylphenol and 20 parts of an adduct of 9 moles of ethylene oxide to 1 mole of a mixture of fatty alcohols having twelve to eighteen carbon atoms.

Polyacrylonitrile tops are printed by the vigoureux method with an aqueous formulation which contains:

|  | G./l. |
|---|---|
| C.I. Basic Yellow 24 | 40 |
| C.I. Basic Red 29 | 16 |
| C.I. Basic Blue 54 | 24 |
| The assistant | 30 |
| Carbob flour thickening | 15 | and which has the pH value 6. The printed tops are treated for forty-five minutes at 102° C. with wet steam and washed and dried as usual. A very satisfactory black and white mélange effect is obtained; the black, which is fast to rubbing, wet and light, has not bled into the unprinted portions of the fibers.

I claim:

1. An assistant for fixing cationic dyes on acrylonitrile polymer fibers by means of steam, consisting essentially of: (a) a carbonate selected from the class consisting of ethylene carbonate, propylene carbonate and mixtures thereof; and (b) at least one nonionic surfactant in the weight ratio of (a):(b) of from 15:85 to 85:15.

2. An assistant as claimed in claim 1 comprising an antifoam in an amount of up to 2% by weight.

3. An assistant as claimed in claim 1 containing components (a) and (b) in the weight ratio of from 35:65 to 65:35.

4. An assistant as claimed in claim 1 which contains as component (b) at least one polyglycol derivative bearing a hydrophobic radical.

5. An assistant as claimed in claim 4 in which the component (b) contains as the hydrophobic radical an alkyl group having six to twenty carbon atoms, an alkylaryl group having six to twenty carbon atoms in the alkyl radical or a polyether group having a carbon-oxygen molecular weight ratio of at least 3:1 and at least one hydrophilic polyglycol radical having a carbon-oxygen molecular ratio of less than 3:1 combined thereto by way of oxygen, nitrogen or sulfur.

6. An assistant as claimed in claim 5 which contains as component (b) at least one adduct of ethylene oxide to an alkylphenol having eight to nine carbon atoms in the alkyl radical.

7. An assistant as claimed in claim 5 which contains as component (b) at least one adduct of ethylene oxide to an aliphatic monoalcohol having twelve to eighteen carbon atoms.

8. An assistant as claimed in claim 2 containing a trialkyl phosphate as the antifoam agent (c).

9. In a process for the dyeing or printing of a cationic dye onto a fiber selected from the class consisting of polyacrylonitrile and copolymers of at least 80% acrylonitrile wherein said dye is applied to the fiber from an aqueous pad liquor or printing paste and is subsequently fixed on the fiber by steaming, the improvement which comprises:

incorporating as a fixing assistant in said pad liquor or printing paste about 5 to 50 grams per liter of pad liquor or per kilogram of printing paste of a composition consisting essentially of
(a) a carbonate selected from the class consisting of ethylene carbonate, propylene carbonate and mixtures thereof, and
(b) at least one nonionic surfactant in a weight ratio of (a):(b) of from 15:85 to 85:15; and
steaming the padded or printed fiber in the presence of said fixing assistant.

10. A process as claimed in claim 9 wherein component (a) of the fixing assistant in propylene carbonate.

References Cited

UNITED STATES PATENTS

| 3,069,218 | 12/1962 | Hermes | 8—92 X |
| 3,069,221 | 12/1962 | Hermes | 8—92 |
| 3,085,848 | 4/1963 | Hinton. | |

GEORGE F. LESMES, Primary Examiner

T. J. HERBERT, Jr., Assistant Examiner

U.S. Cl. X.R.

8—172, 173, 177

PO-1050
(5/69)

UNITED STATES PATENT OFFICE
CERTIFICATE OF CORRECTION

Patent No. 3,529,927          Dated September 22, 1970

Inventor(s) Hans-Jochem Ulrich

It is certified that error appears in the above-identified patent and that said Letters Patent are hereby corrected as shown below:

Column 4, line 40, insert -- $CH_3OSO_3 (-)$ --.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents